Patented Feb. 15, 1927.

1,617,412

UNITED STATES PATENT OFFICE.

CARL S. MINER, OF CHICAGO, ILLINOIS, ASSIGNOR TO THE QUAKER OATS COMPANY, OF CHICAGO, ILLINOIS, A CORPORATION OF NEW JERSEY.

SYNTHETIC PERFUME.

No Drawing. Application filed December 26, 1922. Serial No. 609,106.

My invention relates to improvements in synthetic perfumes, flavoring extracts and similar synthetic materials.

Synthetic materials have become of considerable commercial importance in the art of manufacturing perfumes, flavoring extracts and allied products. However, the materials heretofore used in manufacturing synthetic perfumes, flavoring extracts and the like have been made from chemicals that are expensive to produce by reason of the complicated and tedious processes which are employed. As a result of these expensive processes, such materials as synthetic perfumes and extracts, have sold at excessively high prices.

By means of my present invention, I provide a synthetic perfume or flavoring extract which will be economical to produce. My present invention contemplates the use of furfural and its derivatives, such as pyromucic acid, furfur alcohol and furfuracrylic acid as the source from which synthetic flavoring extracts and perfumes may be produced which possess essentially new and highly desirable properties.

In accordance with my present invention, I procure synthetic materials of the character indicated above directly from furfural as well as from its derivatives, such as pyromucic acid, furfur alcohol and furfuracrylic acid. I have discovered that esters formed from pyromucic acid and the aliphatic alcohols are especially desirable as materials for synthetic perfumes, synthetic flavoring extracts and the like. I have prepared a considerable number of furfural derivatives, such as the methyl-, ethyl-, propyl-, butyl- and amyl-pyromucates, all of which have distinctive odors and flavors of the qualities highly desired as flavoring extract and perfumes. Since these esters may be very easily prepared and since the raw materials for their manufacture are quite inexpensive, synthetic perfumes and extracts embodying my invention may be sold much cheaper than corresponding synthetic materials heretofore produced. In view of the highly characteristic flavors and odors of the foregoing furfural derivatives, I am also able to extend the range of flavoring and perfume materials considerably beyond that heretofore attained with synthetic materials procured from other chemicals.

The following process I have employed for producing the esters of pyromucic acid and particularly ethyl pyromucate. To 11.2 parts of pyromucic acid I add 30 parts of ethyl alcohol and 15 parts of concentrated (95%) sulphuric acid. This mixture is then boiled for 10 minutes in a vessel connected with a reflex condenser. The condensed material is then cooled and neutralized with sodium carbonate. From the condensed material, the ethyl pyromucate may be separated by extracting with ether allowing the ester to crystallize from the ethereal solution. This ethyl pyromucate has a highly pleasing and delectable odor and may be employed as a material for a synthetic perfume or flavoring extract.

It is to be understood that my invention is not to be limited in its scope except by the prior art and the limitations defined in the appended claims.

What I claim as new and desire to secure by Letters Patent of the U. S. is:—

1. In the art of perfuming, flavoring and the like, the employment of a furane derivative as the perfuming, flavoring or like agent.

2. In the art of perfuming, flavoring and the like, the employment of an ester of pyromucic acid as the perfuming, flavoring or the like agent.

3. In the art of perfuming, flavoring and the like, the employment of ethyl pyromucate as the perfuming, flavoring or the like agent.

4. In the art of perfuming, flavoring and the like, the employment of an ester of pyromucic acid in admixture with an aliphatic alcohol as the perfuming, flavoring or the like agent.

5. In the art of perfuming, flavoring and the like, the employment of an ester of pyromucic acid in admixture with an aliphatic alcohol or the paraffin series as the perfuming, flavoring or the like agent.

6. In the art of perfuming, flavoring and the like, the employment of a compound of an acidic furane derivative as the perfuming, flavoring or the like agent.

In witness whereof, I have hereunto subscribed my name.

CARL S. MINER.